Figure 1:
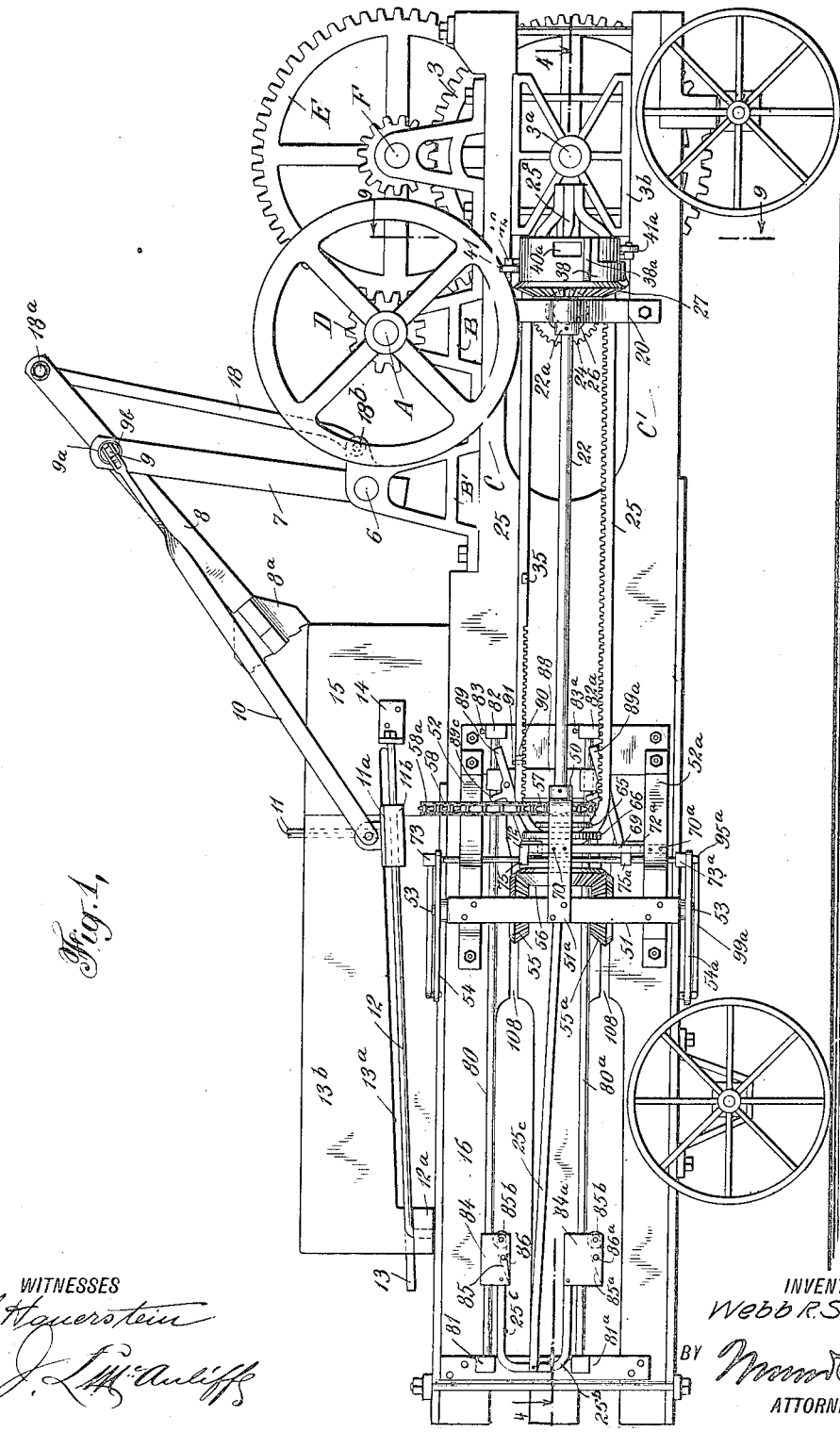

W. R. SMITH.
SELF FEEDING AND SELF TYING MECHANISM FOR HAY PRESSES.
APPLICATION FILED JULY 8, 1915.

1,182,718.

Patented May 9, 1916.
10 SHEETS—SHEET 1.

WITNESSES

INVENTOR
Webb R. Smith
BY
ATTORNEYS

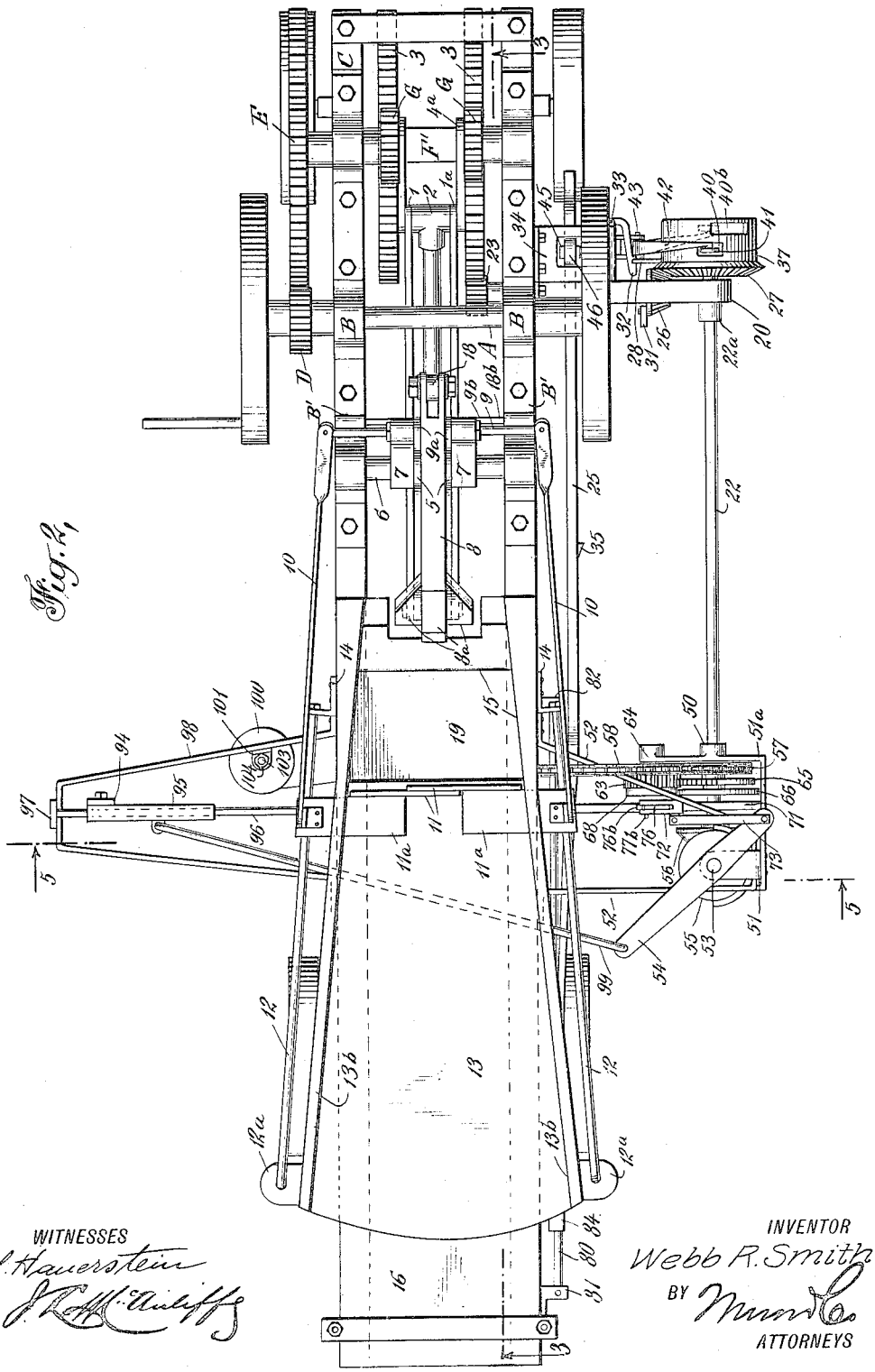

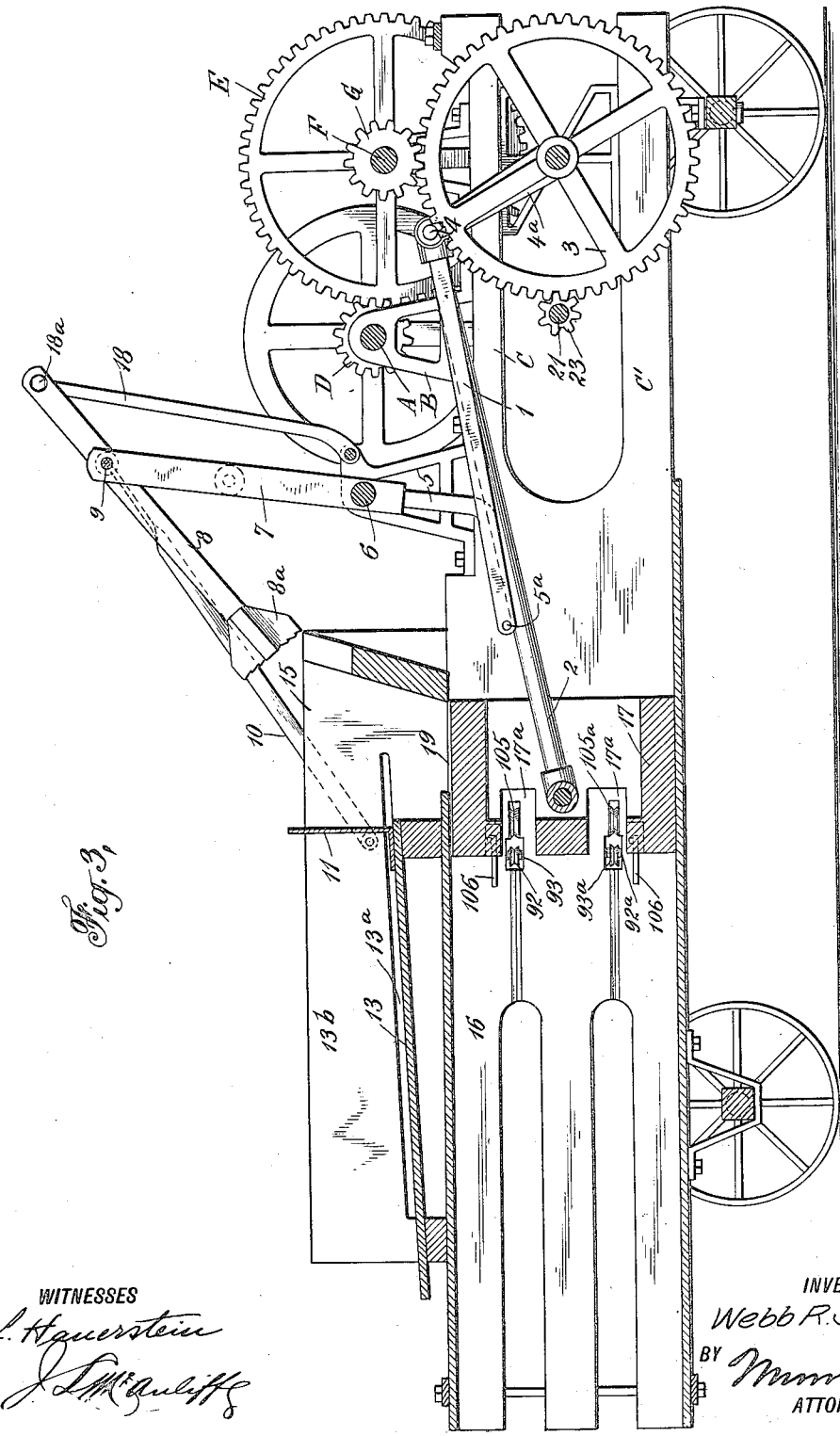

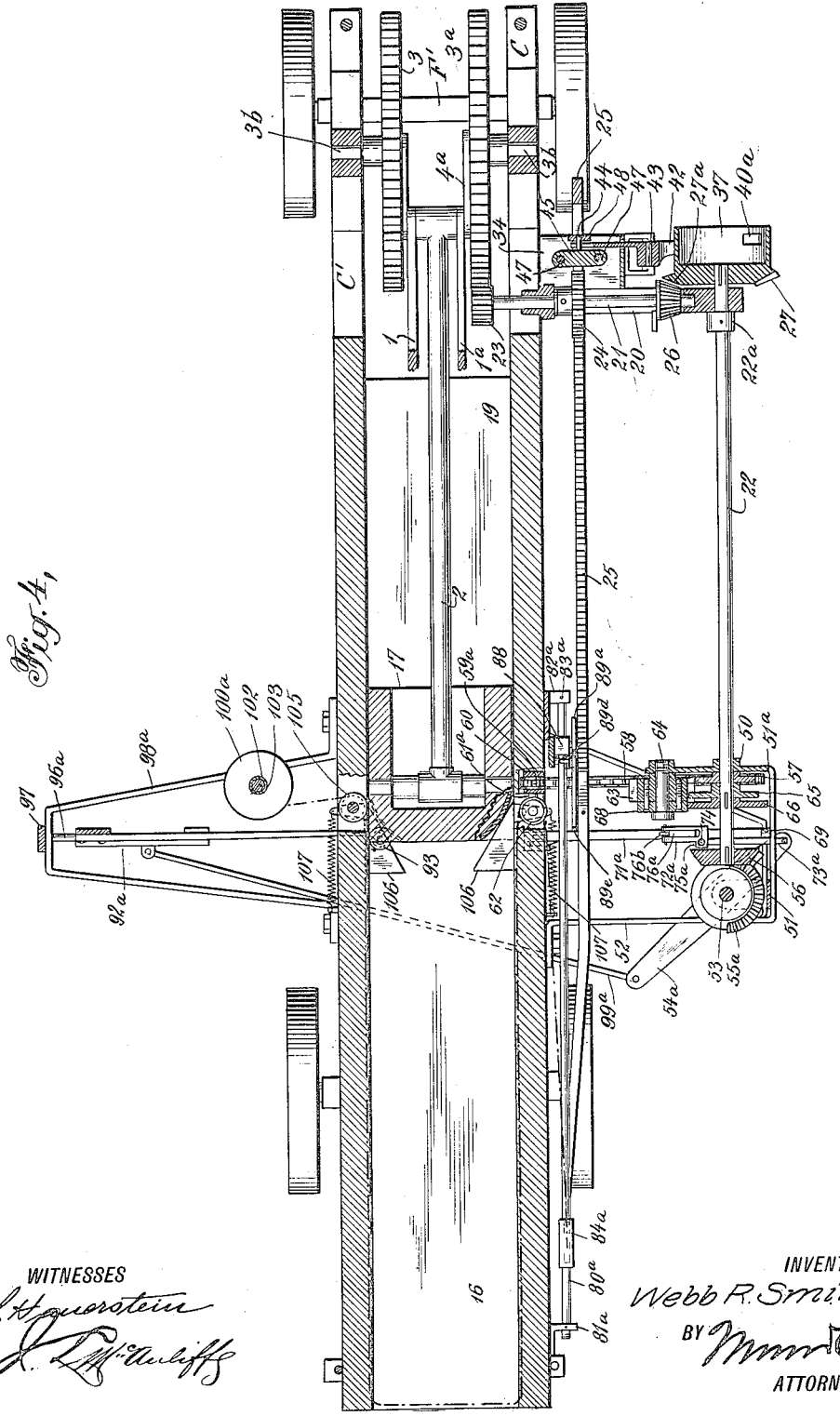

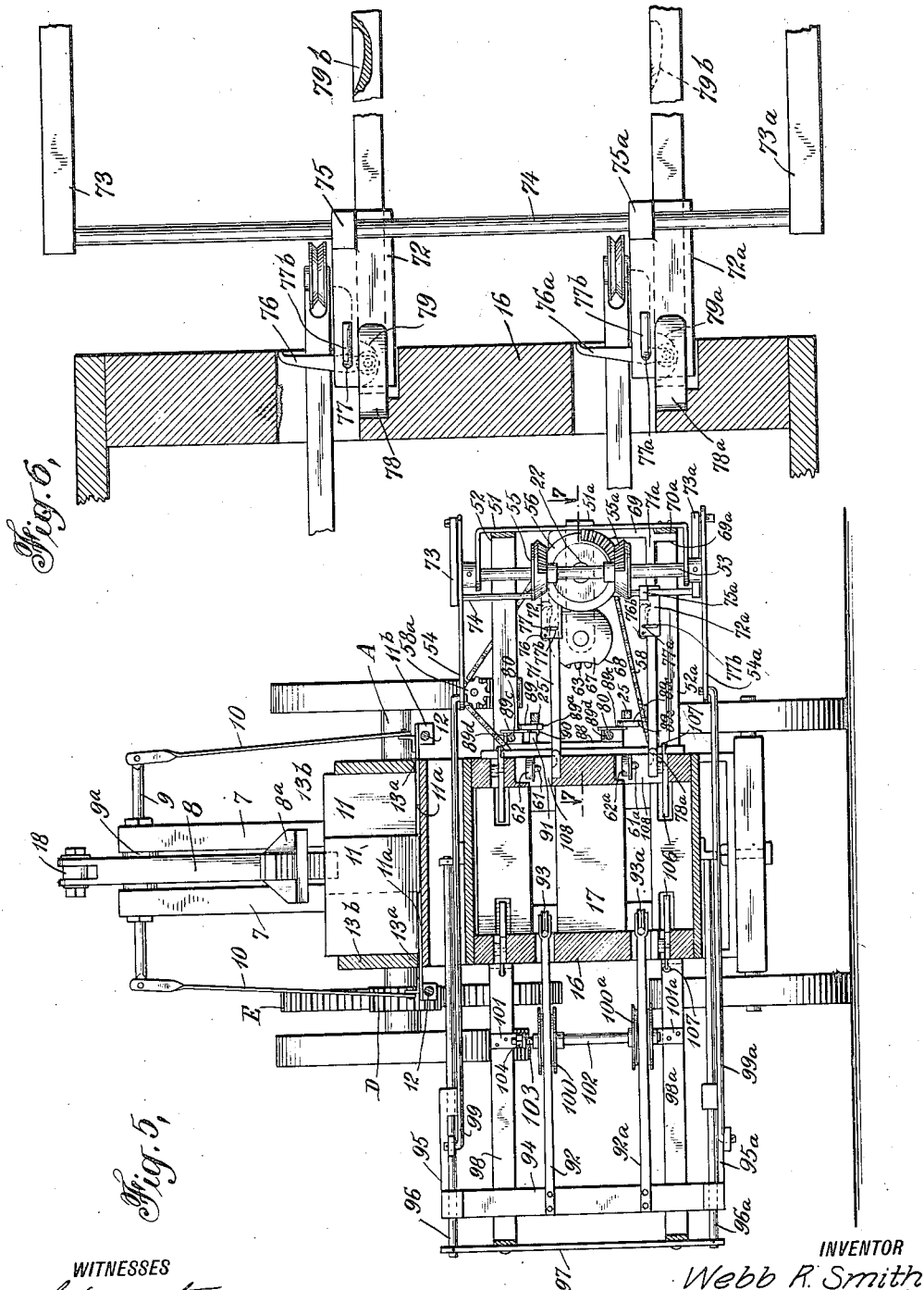

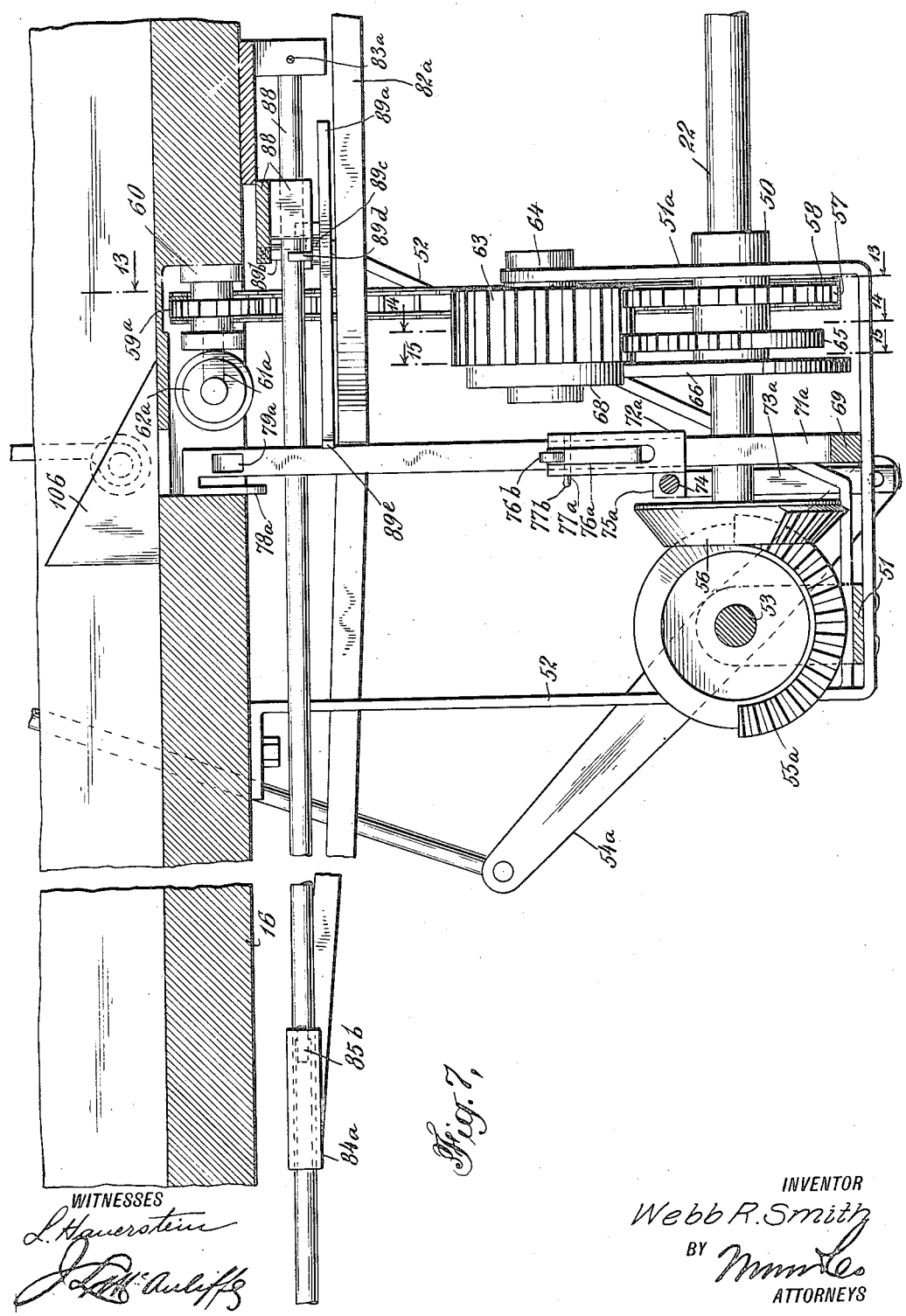

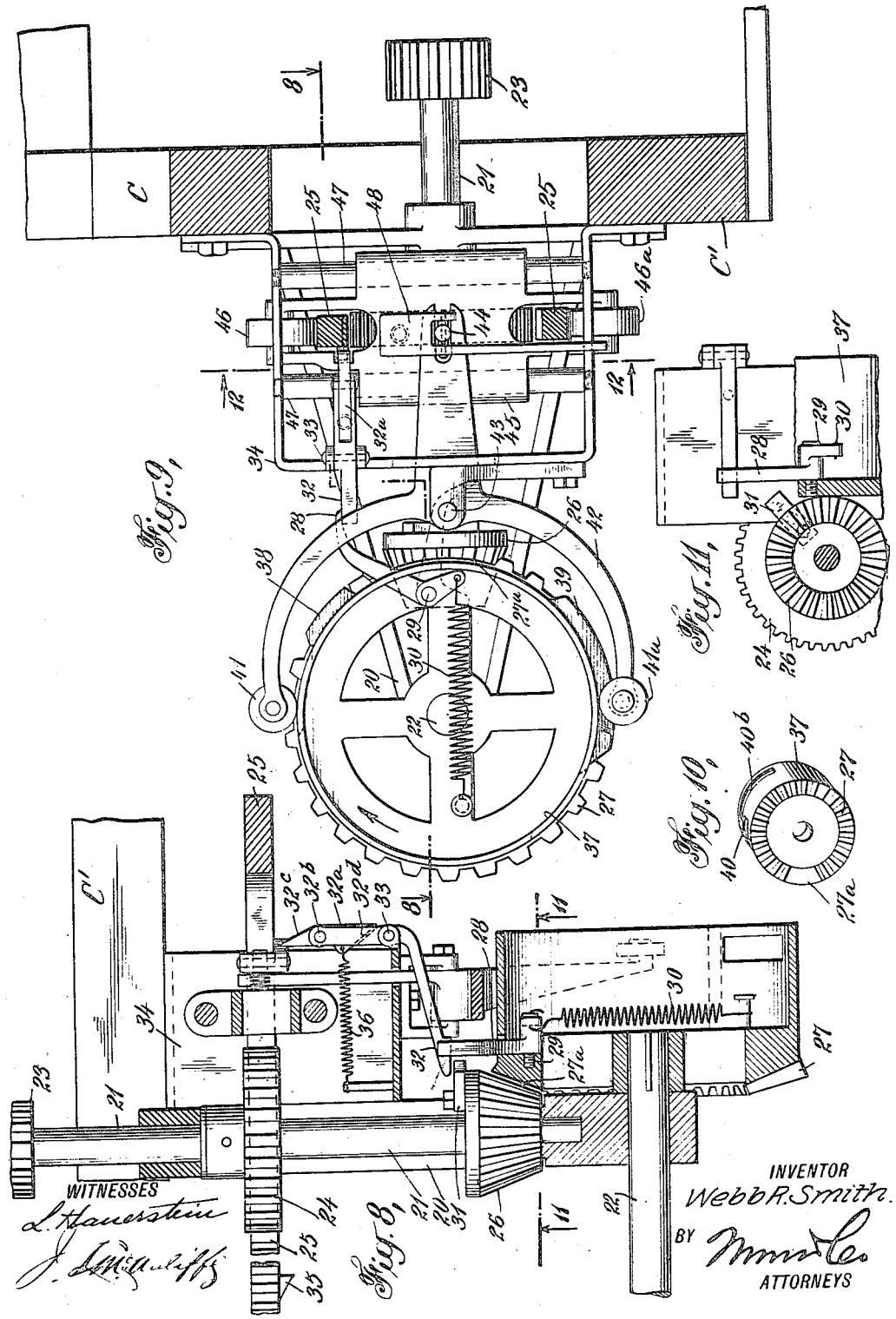

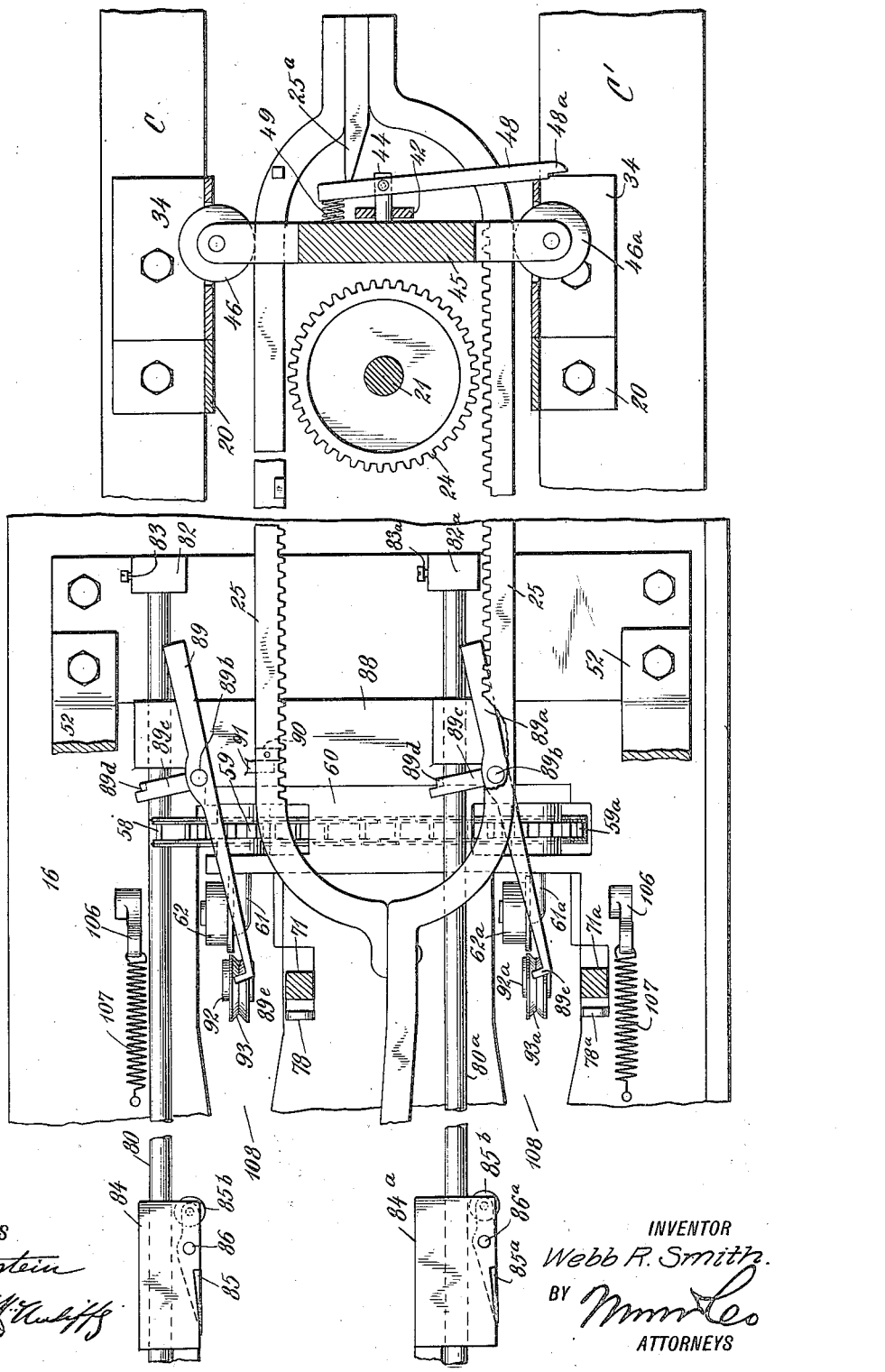

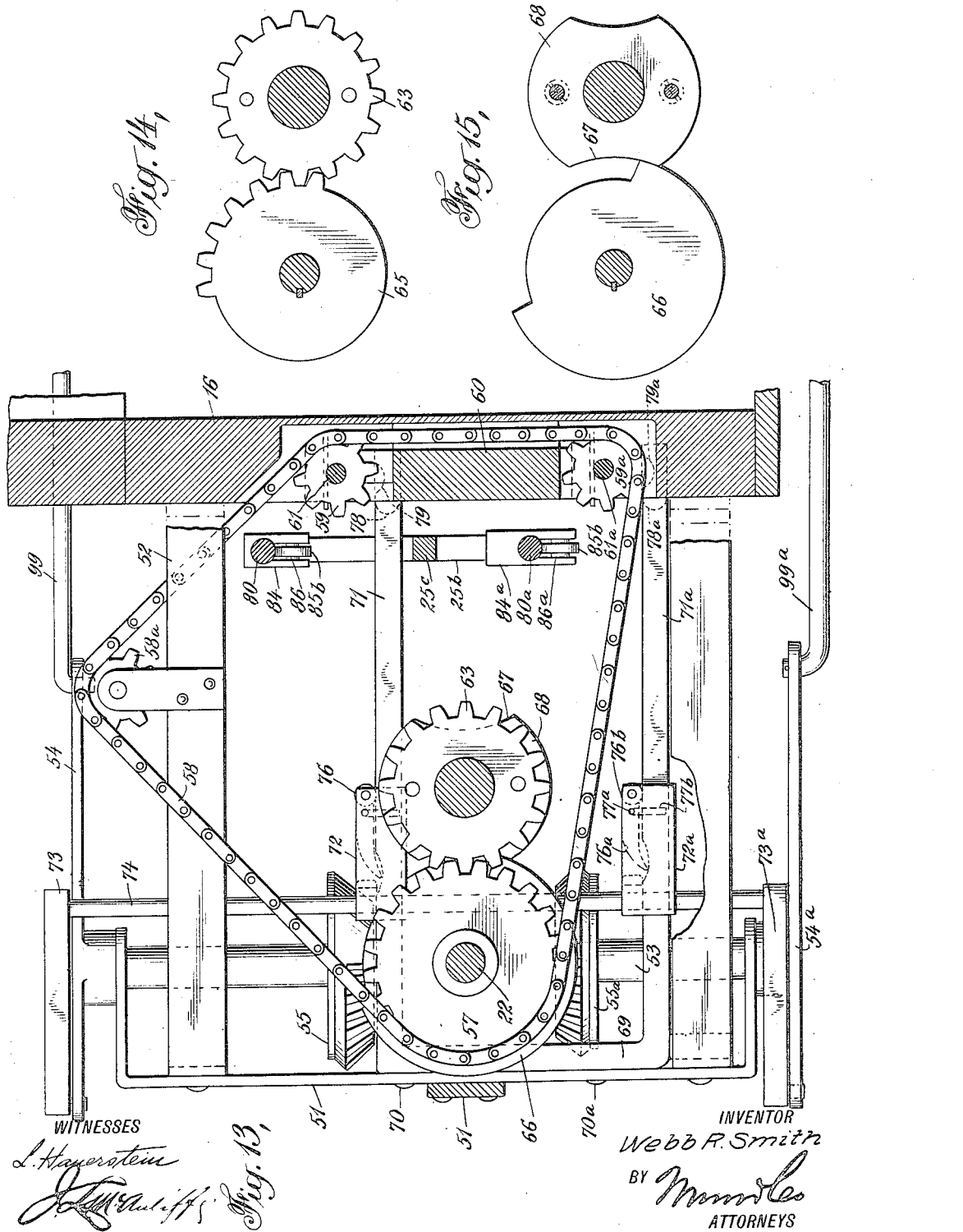

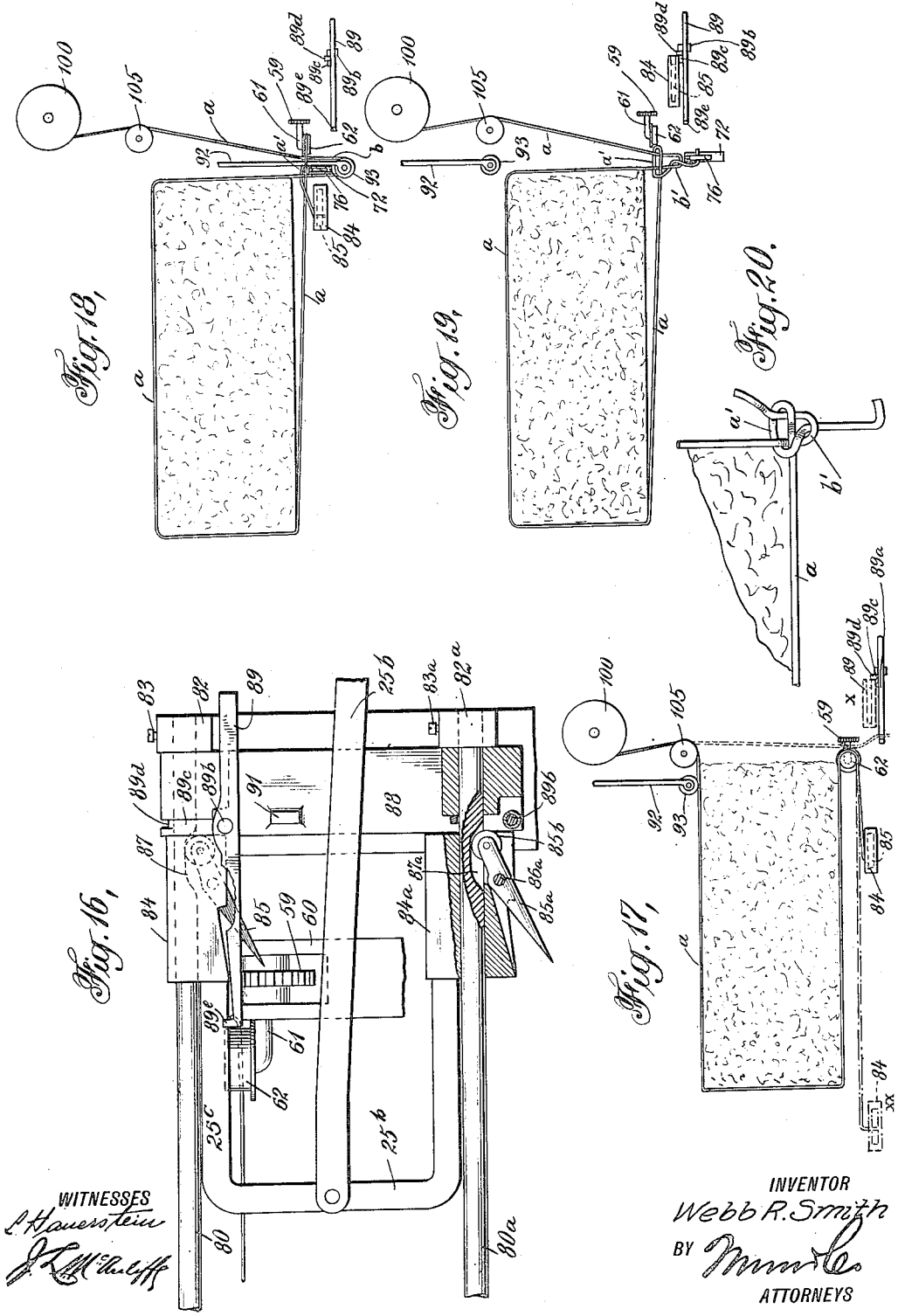

UNITED STATES PATENT OFFICE.

WEBB R. SMITH, OF ERIE, COLORADO.

SELF-FEEDING AND SELF-TYING MECHANISM FOR HAY-PRESSES.

1,182,718.

Specification of Letters Patent.

Patented May 9, 1916.

Application filed July 8, 1915. Serial No. 38,635.

*To all whom it may concern:*

Be it known that I, WEBB R. SMITH, a citizen of the United States, and a resident of Erie, in the county of Weld, State of Colorado, have invented a new and Improved Self-Feeding and Self-Tying Mechanism for Hay-Presses, of which the following is a full, clear, and exact description.

The prime objects of the invention are to produce a self-feeding and wire-tying mechanism entirely automatic in operation; to provide a tying mechanism so constructed and arranged as to avoid the necessity for the use of head blocks for separating the bales from each other in the press; to provide a construction whereby the friction between the wire-tying mechanism and the wire is reduced to the minimum, thereby greatly reducing the wear on the parts of the tier, and to provide a tying mechanism embodying the use of wire direct from spools or reels, thereby avoiding the necessity and expense of making up the wire into given lengths.

A further object of the invention is to improve the mechanism of the indicated character in various particulars with reference to strength and efficiency, and with a view to promote convenience in assembling the parts as well as simplicity of adjustment and control.

Other objects and advantages of the invention will appear as the description proceeds.

Reference is had to the accompanying drawings forming part of this specification, in which similar characters of reference indicate corresponding parts in all the views, and in which—

Figure 1 is a side elevation of a press embodying my invention. Fig. 2 is a plan view. Fig. 3 is a longitudinal, vertical section on the line 3—3, Fig. 2. Fig. 4 is a horizontal section on the line 4—4, Fig. 1. Fig. 5 is a cross-section on the line 5—5, Fig. 2. Fig. 6 is a detail sectional plan view on an enlarged scale showing certain wire releasing elements in different position from those indicated at the right of Fig. 5. Fig. 7 is a detail, horizontal section on line 7—7 of Fig. 5 and on an enlarged scale. Fig. 8 is a section on line 8—8 of Fig. 9. Fig. 9 is a detail in transverse, vertical section on the line 9—9 of Fig. 1. Fig. 10 is a perspective view on reduced scale of the can drum forming an important feature in Figs. 8 and 9. Fig. 11 is a longitudinal, vertical section on line 11—11 of Fig. 8. Fig. 12 is a detail longitudinal, vertical section on the line 12—12, Fig. 9. Figs. 13, 14 and 15 are sections on the lines 13—13, 14—14 and 15—15 in Fig. 7. Fig. 16 is a detail in sectional plan view and on an enlarged scale, of certain wire gripping and severing elements indicated at the left of Fig. 12. Figs. 17, 18 and 19 are diagrammatic views illustrating different stages in the tying operation, and Fig. 20 shows the finished knot.

In constructing a practical embodiment of my invention in accordance with the illustrated example the drive shaft A, operated from any convenient source of power, is mounted in bearings B on the adjacent top frame elements C of the press and has a pinion D in mesh with a gear wheel E on a countershaft F. The countershaft F, in turn, has pinions G arranged to operate the self-feeding mechanism of the press.

The self-feeding mechanism preferably comprises two pitmen, 1, 1ª, disposed one on each side of the main press pitman 2, between two main driving gears 3, which are in mesh with the pinions G and are mounted on stud shafts 3ª, turning in suitable bearings 3ᵇ between the upper and lower frame members, C, C¹. The several pitmen 1, 1ª, 2 are all driven in unison by a suitable crank connection with the gears 3 or their stud shafts 3ª. In the form shown the transverse pin or rod 4 forms part of what is essentially a crank 4ª in rigid relation to the gears 3. The opposite ends of the pitmen 1, 1ª are pivotally connected to the lower forked end of a bent crank-arm 5, secured to a rockshaft 6. The forked arrangement of the crank 5 is employed to permit relative movements of the main press pitman 2 and the pitmen 1, 1ª. The shaft 6 turns in a suitable bearing B¹ adjacent to the bearings B of the drive shaft A, and secured to said shaft 6 are two feeder arms 7, which carry the feeder-head 8 between said arms, and pivotally connected therewith, said feeder-head having the head proper 8ª thereof suitably formed, for instance, with cross members as shown. The feeder-head is held in place between the feeder arms 7 by a transverse rod 9 passing through the upper ends of the feeder arms and through the said feeder-head, the rod 9 being prevented from transverse movement by any suitable device, such as lock-nuts 9ᵇ, pins or the like, there being employed also preferably spacing washers 9ª between the feeder arms and feeder-head. The transverse rod 9 extends outwardly at each end beyond the feeder arms 7 and has pivotally connected therewith two pitmen 10, which at their opposite ends are pivotally connected with feed condensers 11. The condensers 11 are slidable on guide rods 12 at each side of the feed table 13, said table having longitudinal slots 13ª in the upright side walls 13ᵇ of the table. The condensers are in the form of plates or boards and have broad bases 11ª resting on the table 13. The guide rods 12 are supported in any suitable manner at the outside of the press, as by lugs 12ª at one end and at the other end in brackets 14 secured to the sides of the hopper 15. The outer ends of the condensers 11 have sleeves 11ᵇ embracing the guide rods 12. The sides 13ᵇ of the feed table 13 are convergent toward the hopper 15 so as to condense the hay as it is carried forward to the hopper, the condenser plates overlapping as they approach the hopper box as shown in Fig. 2.

By the described arrangement the self-feeding operates as follows: When the plunger 17, which is carried by the main pitman 2, begins its forward stroke the two pitmen 1, 1ª rock the crank 5, which rocks the shaft 6, thereby raising the feed arms 7, secured to said shaft, thus lifting the feeder-head 8. The feeder-head in its movements is controlled by an equalizing bar 18, which is pivotally connected at its upper end as at 18ª, with the feeder-head beyond the pivot rod 9 on which the said head rocks, the lower end of the equalizing bar 18 being pivoted as at 18ᵇ to the bracket B¹ of the shaft 6, or other fixed part of the press. The upward movement of the feeder-arms 7 carries the rod 9 to actuate the pitmen 10, and thereby draws the feed-condensers 11 toward the hopper 15 to feed the hay to said hopper. The hay in the hopper is now ready to be forced downwardly by the feed-head 8, 8ª into the compression chamber 19 in front of the plunger 17 which has reached the rearward position. The continued movement of the gears 3 in giving a forward stroke to the plunger 17, will at the same time actuate the pitmen 1, 1ª, and through the described feed arms and connections will give a downward movement to the feeder-head 8, the condenser elements 11 being in the meantime returned to the rear end of the table 13, ready to again carry forward the material to the hopper.

The tying mechanism and actuating means therefor will now be described.

At the forward or outer end of the machine a bracket 20 is provided which forms bearings for a short transverse shaft 21, and a longitudinally ranging shaft 22. On the inner end of the shaft 21 is fixed a small pinion 23, which is in mesh with and actuated continually by one of the main driving gears 3. Also on the shaft 21 and just outside on the frame of the press is another pinion 24, which is arranged to actuate a rack 25 having upper and lower rack members above and below the said pinion 24, the rack being arranged longitudinally on the press on the outer side, and the purpose of which will appear. On the outer end of the shaft 21 a small bevel pinion 26 is fixed which meshes with a larger bevel gear 27 mounted on the forward end of the longitudinal shaft 22. The bevel gear 27 carries a clutch to actuate the tying mechanism at the proper time as hereinafter explained. The three pinions 23, 24 and 26 being all fixedly secured to the shaft 21 will be run continuously by one of the driving gears 3. The bevel gear 27, it will be observed, is mutilated to the extent that two or more of its teeth are omitted as at 27ª, the number omitted being dependent upon the nature of the gear employed. The untoothed space thus provided is located adjacent to the small bevel pinion 26, which therefore can turn freely in its untoothed space without affecting the gear 27. On the pinion 27 at the back of the untoothed space 27ª a lever 28 is fulcrumed, as at 29, and under the influence of a spring 30. The lever 28 is just out of reach of the bevel pinion 26 and it is so arranged as to be engaged by lug or projection 31 on said pinion 26, the said lever 28 and lug 31 being timed so that when the lever is engaged and tripped by the lug 31, the said pinion 26 and the bevel pinion 27 are brought into mesh with each other and the tying mechanism thereby operated. At all times, however, except during the tying operation, the lever 28 is held out of the path of the trip lug 31 by means of a lever 32, which is fulcrumed at 33 on a bracket 34, secured to the adjacent side of the press. The lever 32 is adapted to be engaged by a lateral trip lug or tooth 35 on the side of the rack-bar 25. The trip lever 32 is held in its normal position by a spring 36, which after the tripping operation caused by the lug 35, returns the trip lever 32 to its normal position, which is such as to engage the lever 28 and hold it out of the way of the trip lug 31 on the bevel pinion 26.

That end of the trip lever 32 that is engaged by the element 35 on the rack-bar has a short section 32ª pivoted as at 32ᵇ on the said lever 32, and held in position by a retractile spring 36. The pivoted section 32ª is beveled as at 32ᶜ to contact with the lug 35, and the opposite end of said pivoted member, as well as the opposed surface of the main lever 32, is reversely beveled as at 32ᵈ. The beveling prevents the movement of the inner end of the pivoted section 32ª (to which spring 36 is fastened), in the direction of the said spring beyond a position parallel with the main part of the trip lever 32, but allows the pivoted section to swing away from the lever when the opposite bevel end 32ᶜ is engaged by the lug 35 upon the return movement of the rack-bar 25, whereby the outer end of the pivoted section 32ᵃ will swing back with the lug 35 until they are disengaged from each other, the spring 36 then serving to return the pivoted section to its normal position. The pivoted section 32ᵃ thus permits the free movement of the rack-bars 25 and its lug 35 on the return stroke thereof, without disturbing the trip lever 32, which at this time is in engagement with the clutch lever 28 on the pinion 27, holding the said lever 28 out of the path of the trip lug 31 on the bevel pinion 26.

On the back of the gear wheel 27 and about even with the rim of the said gear wheel, is an annular flange or drum 37 of considerable width, and having on its peripheral surface cams 38, 39. There are also formed in the drum, slots or openings 40, 40ᵃ having correlation to the said cams, as will appear, together with a third slot 40ᵇ. The flange or drum 27 extends completely around the entire circumference of the bevel gear 27 and forms a track or guide for two rollers 41, 41ᵃ, which turn in the ends of a forked lever 42, which is fulcrumed at 43 on the bracket 34. The forks of the lever 42 are so formed that the upper roller 41 travels on the inner edge of the flange 37, while the roller 41ᵃ travels at the outer edge and approximately diametrically opposite the first roller, the arrangement being such as to prevent one roller 41 or 41ᵃ being acted upon by the cam 38 or 39 of the other roller.

At the end of the lever 42 opposite to the rollers thereon, said lever receives a stud 44 which is in fixed position on an upright sliding frame 45, said frame having at its upper and lower ends rollers 46, 46ᵃ. These rollers receive between them the rack-bar 25, which it is to be observed is in loop form, representing upper and lower rack members, the rollers 46, 46ᵃ serving to hold the rack bar clear of the pinion 24 on the shaft 21. The sliding frame 45 has guided movement on two parallel upright rods 47, secured to a bracket 34, this arrangement permitting the said frame 45 to have free sliding, up-and-down movement when actuated by the lever 42, which is controlled in turn by the cams 38, 39 on the flange 37.

On the outer end of the stud 44 is pivoted a lever latch 48 which is notched at its lower end at the inside as at 48ᵃ, the notched end designed to engage and rest upon the bracket 34 when the upright sliding frame 45 is raised by the lever 42. The latch 48 is held in engagement with the bracket 34 by spring 49 to sustain the frame 45 in a fixed position with the rack-bar 25 in engagement with the pinion 24. The engagement of the pinion 24 and rack-bar 25 continues until released by the tripping action of a fixed trip arm 25ᵃ on the forward end of the rack-bar 25. The arm 25ᵃ, coming in contact with the lever latch above the pivot thereof, causing the lower notched end of the said latch to move outward out of engagement with the bracket 34 thereby allowing the upright sliding frame 45 to drop and lower the rack-bar 25 and disengaging the said rack-bar from the pinion 24 on shaft 21.

The longitudinal shaft 22, which is supported at its forward end in a bearing formed by the bracket 20, is supported at its rear end in a bearing 50 on an angle member 51, secured to the upright member 51 by bracket members 52, 52ᵃ, which are secured to the side of the baling press adjacent to the compressing chamber 19. The upper and lower ends of the bracket member 51 are so formed as to provide bearings and support for an upright shaft 53, said shaft having secured to it at its upper and lower ends, respectively, double arm cranks 54, 54ᵃ, that is to say, cranks having arms extending in opposite directions from each other on the shaft 53. On the said shaft 53 are two mutilated bevel pinions 55, 55ᵃ, the mutilations of which extend for half the face of each pinion. The pinions 55, 55ᵃ are driven by a third mutilated bevel pinion 56, which is fast on the rear end of the longitudinal shaft 22. The end thrust of the pinion 56 and bevel gear 27 is taken up by a collar 22ᵃ on the shaft 22 adjacent to the bracket 20. The bevel pinion 56 is slightly larger than the pinion 55, 55ᵃ, and while making a complete revolution, has just enough cog teeth to turn the bevel pinion 55 through half a revolution during the first half of its own revolution, and turning the other bevel pinion 55ᵃ an equal distance in the reverse direction during the second half of its own revolution.

On the shaft 22, a short distance back of the bevel pinion 56, is a loose sprocket gear 57, over which a chain 58 runs, said chain running also over a chain sprocket 58ᵃ mounted on the bracket 52, and over two small sprockets 59, 59ᵃ, which are mounted to turn in a fixed frame 60 in the side of the press frame. The sprockets 59, 59ᵃ are keyed to two short shafts 61, 61ᵃ, said shafts having bearings in the side of the frame and extending beyond the frame 60 and sufficient to have mounted on their bent ends two wire-supporting rollers 62, 62ᵃ, which thus offset to revolve bodily about the axes of shafts 61, 61ᵃ, are free to turn on their own axes. During the baling or pressing operation these rollers 62, 62ᵃ are held in an upright position with a wire passing around them, as will appear, each roller having a small flange at its lower end to prevent the wire from slipping off in a downward direction. The sprocket gear 57 receives its motion from a transmission pinion 63 which is loosely mounted on a fixed axle 64, and driven by a mutilated pinion 65, which is fixed on the shaft 22 alongside of the sprocket gear 57. The mutilated pinion 65 is designed to have just enough cog teeth to produce one revolution in the small sprockets 59, 59$^a$ when they are actuated by it through the transmission pinion 63 and the sprocket gear 57, three-quarters of its revolution being accomplished during the first part of the tying act, the remaining one-quarter revolution being effected during the last part of the tying. The small sprockets 59, 59$^a$ and the rollers 62, 62$^a$, are prevented from moving from their proper position during the bale-forming operation, by the mutilated pinion 65, which at this time is in mesh with the transmission pinion 63, and during the tying period, after having made three-quarters of a revolution they are retained in position by a revolving cam 66 which is connected to and is part of the mutilated pinion 65. This cam 66 is round and is intended to engage a concave surface 67, which is located in the outer rim of flange 68 on the end of the transmission pinion 63. The revolving cam 66, turning with the mutilated pinion 65, is brought into engagement with the concave surface 67 of the flange 68 just as the cog teeth of the mutilated pinion 65 have passed out of engagement with the transmission pinion 63, and the free turning of the cam 66 against the concave surface 67, locks the transmission pinion 63 against turning in either direction until the mutilated pinion 65 has finished its revolution and again engages the said transmission pinion and completes the revolution of the small sprockets 59, 59$^a$.

Two transverse guide rods 71, 71$^a$, spaced vertically from each other, are secured to bracket elements adjacent to the mutilated pinion 56. As here shown, the guide rods 71, 71$^a$ are square in cross-section and they are connected by a vertical member 69, integral therewith, which is secured to the bracket element 51$^a$, as at 70, also an extension 69$^a$ of the member 69 is shown secured to the lower bracket member 52$^a$ as at 70$^a$. The guide rods 71, 71$^a$ receive sliding wire-stripping members 72, 72$^a$, arranged to slide transversely back and forth on the said guide rods at the proper time. The sliding wire-stripping members 72, 72$^a$ are actuated by pitmen 73, 73$^a$, which are connected respectively, at one end thereof with an upright rod 74, and at the other end with shorter arms of the two arm cranks 54, 54$^a$, the rod 74, passing through holes in projections 75, 75$^a$ (Fig. 6) on the side of the members 72, 72$^a$, the arrangement permitting a slight turning of said rod 74 when it is actuated by pitmen 73, 73$^a$, and so causing the wire stripping members 72, 72$^a$ to slide to the inner ends of the guide rods 71, 71$^a$ and return.

Each wire stripping member 72, 72$^a$ has pivoted at its forward or inner end a wire gripping finger 76, 76$^a$ respectively, which have anti-friction rollers 76$^b$ mounted in their ends, said rollers being designed to be in contact with and roll upon the top surfaces of the rods 71, 71$^a$. The gripping fingers 76, 76$^a$ are fixed to their pivot pins or axles 77, 77$^a$, which turn in bearings in the sides of the wire-stripping members 72, 72$^a$ and pass through one side of each stripping member, the outer ends of the pivot pins being turned downward, thus forming a short arm or lever 77$^b$. The arms or levers 77$^b$ are arranged to contact with shoulders or projections 78, 78$^a$ (Figs. 7 and 13) on the inner ends of the guide rods 71, 71$^a$. When the arms 77$^b$ come in contact with the projections 78, 78$^a$ the said arms are turned upwardly thereby causing the wire-gripping fingers 76, 76$^a$ to assume an upright position with the anti-friction rollers at their forward ends dropping into oblong slots 79, 79$^a$ in the guide rods 71, 71$^a$, said slots being just long enough to admit the rollers so that on the return movement of the wire-stripping members 72, 72$^a$ the wire-gripping fingers 76, 76$^a$ quickly return to their normal position owing to the rollers 76$^b$ coming into contact with the outer ends of the slots.

On the side of the press box and parallel with it are two longitudinal rods 80, 80$^a$, fastened at their rear ends, as by brackets 81, 81$^a$, and at their forward ends fitting into holes in brackets 82, 82$^a$, having set screws 83, 83$^a$. On the rods 80, 80$^a$ are two wire cutters and carriers 84, 84$^a$ which are arranged to slide on the said rods and are actuated partly by double rack-bar 25, to which they are attached at the rear end of said rack bar, and partly by the movement of the hay within the bale case 16, as will be explained hereinafter. The connection of the two wire cutters and carriers 84, 84$^a$ with the rack bar 25 (see Figs. 1 and 16) may be through the medium of a U-shaped member 25$^b$ and arm 25$^c$ integral with the said rack-bar 25.

The wire cutters and carriers 84, 84$^a$ are provided with wire-cutting and gripping fingers 85, 85$^a$ (see Figs. 12 and 16) which are pivoted at 86, 86$^a$, and are provided with anti-friction rollers 85$^b$, which are designed to be in contact with the under side of the rods 80, 80$^a$ and roll on same when the wire cutters and carriers are traveling. At the forward ends of the rods 80, 80$^a$, at the under side thereof, slots 87, 87$^a$ are produced (Fig. 16) into which, at the proper time, enter the rolls 85$^b$, thus allowing the cutting and gripping fingers 85, 85ᵃ to drop and release the wires which they have been holding as hereinafter explained and positioning and actuating the said fingers to cut and grip the next wire at the proper time.

On the rods 80, 80ᵃ, at their forward ends, (see Figs. 7 and 12) there is a sliding frame, 88, which carries thereon, just below the rods 80, 80ᵃ wire engaging fingers 89, 89ᵃ which are pivoted between their ends as at 89ᵇ. On each of these wire-engaging fingers, and forming part thereof, is an upright, rigid lever-arm 89ᶜ presenting an inwardly extending member 89ᵈ, which is arranged to be engaged by wire cutters and carriers 84, 84ᵃ on the forward movement of the latter, thereby causing the wire-engaging fingers 89, 89ᵃ to swing the rear upturned ends 89ᵉ of the fingers 89, 89ᵃ from their normal position, which is near the side of the guide rods 71, 71ᵃ, to a position about even with the upper side of the wire supporting rollers 62, 62ᵃ, the object being to place the next following wires (to be cut and gripped by the wire cutters and carriers 84, 84ᵃ) in a position between the rollers 62, 62ᵃ and the fixed frame 60, this being accomplished by the wire cutters and carriers being moved forwardly and coming in contact with the upright levers 89ᶜ on the wire-engaging fingers 89, 89ᵃ, causing said fingers to swing upwardly and engage the wires which at this time are just above them. The continuing movement of the carriers 84, 84ᵃ carries forward the sliding frame 88 with the fingers 89, 89ᵃ, said fingers pulling the wires with them by engagement of the members 89ᵉ until the wires have reached the proper position, the fingers 89, 89ᵃ being retained in this position upon the return movement of the wire cutters and carriers 84, 84ᵃ, by engagement of said fingers at the ends opposite the members 89ᵉ with the brackets 82, 82ᵃ. Thus the wires are retained in a proper position to be engaged, cut, and gripped by the cutters and carriers on their return movement, the sliding frame 88 being returned to its original position by a lug 90 which is fixed on the rack-bar 25 coming in contact with a projection 91 on the said sliding frame. The wire-engaging fingers 89, 89ᵃ are then permitted to drop into their normal position beside the rods 71, 71ᵃ, and being prevented from dropping beyond this position by the inwardly projecting members 89ᵈ of the arms 89ᶜ coming to rest on the rods 80, 80ᵃ.

On the opposite side of the press from the described mechanism are located the two wire-carrying needles 92, 92ᵃ, each having on its inner ends a peripherally grooved anti-friction roller or sheave 93, 93ᵃ. The needles are rigidly secured to an upright bar 94, which in turn is fastened at its upper and lower ends to transversely sliding frames 95, 95ᵃ which have guide movement on two horizontal rods 96, 96ᵃ. The rods 96, 96ᵃ are connected at their outer ends by another upright bar 97, which in turn is fastened to and ties together two brackets 98, 98ᵃ, which are secured at their opposite ends to the frame of the press. The rods 96, 96ᵃ extend part way across the upper and under sides of the bale case 16, and are securely fastened thereto. The object of placing the guide rods 96, 96ᵃ part way across the upper and under sides of the bale case is to permit the free passage of the sliding frames 95, 95ᵃ, which are made with long bearing surfaces on the said rods so as to prevent any side motion of the needles 92, 92ᵃ, thus holding them to their proper positions. The needles 92, 92ᵃ are actuated at the proper time transversely of the press by two rods or pitmen 99, 99ᵃ, which are pivoted at one end to the sliding frames 95, 95ᵃ and at their opposite ends to the longer arms of the cranks 54, 54ᵃ, said cranks being given a one-half turn and reversed, whereby to draw the needles across the press and return them.

The wires a, a for the tying operation are carried on two spools or reels 100, 100ᵃ which are mounted between projections 101, 101ᵃ on the brackets 98, 98ᵃ. The said spools are separated from each other by a tube or sleeve, 102, a bolt 103 extending through the projections 101, 101ᵃ through the spool and through the sleeve 102, holding the spools in place, the proper tension on the wire being obtained by tightening the nut 104 on the upper end of the bolt 103 to increase or decrease the friction on the spools. The wire leaving the spools 100, 100ᵃ, passes around grooved pulleys or idlers 105, 105ᵃ, which are mounted in the side of the press and are in line with and just at the side of the grooved rollers 93, 93ᵃ on the needles. The wires pass from the idlers 105, 105ᵃ directly in front of the grooved rollers 93, 93ᵃ on the ends of the needles and just in front of the bale being formed, to the other side of the press. The usual dogs 106 and their springs 107 for engaging the hay as it is pressed forwardly are indicated in Fig. 4.

Having described in detail the construction and arrangement of the tying mechanism, I will now explain the mode of operation.

Initially the hay is fed into the machine until the bale-case 16 is full, the hay being restrained against springing back into the compression chamber 19 by the dogs 106. When the bale case is full, the wire cutters and carriers 84, 84ᵃ are manually moved to their extreme forward positions, indicated at x (Fig. 17), the rack-bars 25 advancing before them. Next the wires are taken from the reels 100, 100ᵃ on the opposite side of the press and passed around the grooved pulleys 105, 105ᵃ, thus crossing the compression chamber 19, just back of the hay in the bale-case 16, and through slots in the side of the press, the wire then being in a position between the rollers 62, 62ª and the fixed frame 60 and extending over the wire-engaging fingers 89, 89ª on the sliding frame 88, and being just in front of the wire cutting and gripping fingers 85, 85ª on the cutters and carriers 84, 84ª. It is to be understood that the initial bale may be bound in any suitable manner. The wire will now be disposed across the press so as to lie in front of the next bale as the latter is being formed. The rack-bar 25 is now pushed to its extreme rear position the wire cutters and carriers moving with it, thereby causing the wire-cutting and gripping fingers 85, 85ª to engage, cut and grip the wires, which will unreel from the spools as the carriers 84, 84ª move rearwardly, the wire passing over the guide pulleys 105, 105ª and around the flanged rollers 62, 62ª. At this time the carriers 84, 84ª will be in the rearward position approximately as shown in Fig. 1, and as indicated at x—x Fig. 17. The press is now ready for operation and the feeding of the hay being continued the wires are firmly gripped between the hay already in the bale-case and the next bale being formed. The advancing movement of the hay will cause the wires a to unwind sufficiently to extend along the adjacent side of the bale as the latter is formed. At the same time the advancing hay will exert tension on the wire at the opposite side of the press, and will draw the carriers 84, 84ª forwardly, each charge of hay drawing the said elements 84, 84ª forward the same distance as it is moved within the bale case, the rack-bar 25 at the same time being pushed forward by the movement of the elements 84, 84ª. This arrangement and operation does away with the use of division blocks for the separation of the bales from each other in the bale case. The forward movement of the wire cutters and carriers 84, 84ª and the rack bar is continued by each succeeding charge of hay until the stud or tooth 35 on the rack-bar comes into contact with the trip lever 32, causing the latter to swing inward toward the bracket 34, thereby releasing the clutch lever 28, so that the spring 30 will spring said lever downwardly into a position to be engaged by the projection 31 on the bevel pinion 26.

The bale case should be of the same length as the bale or preferably a little longer than one bale, the reason for this being that it is impossible to make every bale of exactly the same length, therefore the wires which are gripped in the cutters and carriers 84, 84ª will not always be just long enough to reach along the adjacent side of the bale, and as the forward end of the bale being formed, which holds the wire against the preceding bale, reaches the rear end of the bale case when the stud 35 acts, the tension on the two wires between the bales will be relaxed, thereby allowing the wires to slide a little around the front end of the bale and make up for any deficiency in the wire. The wire cutters and carriers 84, 84ª and the rack bar 25 will be held against any further forward movement for the present by reason of the stud 35 being in contact with the trip lever 32, and the wire cutters and carriers will then be in a position on the opposite side of the rods 71, 71ª from the flanged rollers 62, 62ª. The clutch lever 28 having been released by the stud 35 it is engaged by the projection 31 on the bevel pinion 26, thus bringing the said pinion and the bevel gear 27 into mesh and so transmitting motion through the shaft 22 to the tying mechanism thereby causing the mutilated pinion 65 to turn the transmission pinion 63 which actuates the sprocket gear 57, thereby transmitting motion through sprocket chain 58 to sprockets 59, 59ª causing these to make three-quarters of a revolution, the flanged rollers 62, 62ª being turned the same distance about the axes of their shafts 61, 61ª, and thereby forming the wires which are around them and gripped in the cutters and carriers 84, 84ª into a loop a' (Fig. 18) through which loops, at the right time, the needles 92, 92ª pass, the rollers being retained in this position by the revolving cam 66. At the same time the mutilated bevel pinion 56, which is mounted on the rear end of the shaft 22 has engaged the bevel pinion 55 imparting to it one-half of a revolution thereby transmitting this one-half through the upright shaft 53 to the double cranks 54, 54ª, which drive the wire-stripping members 72, 72ª with their short ends, and pulling the wire-carrying needles 92, 92ª, by their longer ends, thus causing said wire-stripping members to move inwardly to the side of the press and the needles to be drawn across the press and passed through slots 108 in the side of the press, just back of the loops a', formed by the flanged rollers 62, 62ª and to project through these loops and to extend out over the wire-stripping members 72, 72ª.

At Fig. 17 I have indicated at x in dotted lines the forward position of a cutter or carrier 84, 84ª, and at x—x the rearward position of a cutter. In this figure the carrier 84 in full lines is approaching the forward position and the bale is nearing completion. In Fig. 18 the bale is completed and a roller 62 has been turned the three-quarters of a revolution from the position indicated in Fig. 17, so that the loop a' is formed sufficiently for the passage of the needle 92 and its roller 93. The needles on their forward passage across the press engage the wires a, which are always just in front of the rollers 93, 93ª and draw the wire from the spools 100, 100ª and carry them across the back of the bale and project through the opposite side of the press, the wire thus presenting two strands with a natural loop or bend $b'$, the wire at the bend or loop $b'$ passing close to a needle at one side, and being held away from the needle at the opposite side by reason of the offset position of its rollers 93 or 93ª. The needle will carry a loop $b'$ through the loop $a'$ formed by the rollers 62, 62ª (Fig. 18) and to a position just above the stripping member (see 72, Fig. 18). At the beginning of the tying operation the plunger or compression head 17 is at the end of its forward stroke, therefore it is provided with slots (17ª, Fig. 3) through which the needles 92, 92ª pass while being drawn across the press. As above explained, the wire-gripping fingers 76, 76ª on the wire-stripping members 72, 72ª are (at the completion of the forward stroke of the stripping members) caused to resume an upright position by reason of the depressions 79ª and the arms 77, the latter contacting with members 78, thus causing the stripping fingers to extend forwardly through the natural loops $b'$ and to the proper height above the needles and just in front of the loops $a'$ formed by the flanged rollers 62, 62ª. Meanwhile as the rollers 62, 62ª complete their three-quarters of a revolution to the position indicated in Fig. 19, the revolution of the bevel gear 27 has brought the cam 38 on the flange 37 into engagement with the upper roller 41 on the double lever 42, thereby raising said lever, the opposite roller 41ª of the lever fitting into the corresponding slot 40. The contact of cam 38 with the roller 41 on lever 42 causes the opposite end of the lever to depress the sliding frame 45, thereby bringing the rack-bar 25 and the pinion 24 into engagement with each other, thus causing the stud 35 on the rack-bar (which, because of its engagement with the trip lever 32 has been holding the wire-cutters and carriers 84, 84ª against forward movement) to be depressed with the rack-bar 25, releasing the stud 35 from the lever 32, which is returned to its normal position by the spring 36. The upper member of the rack-bar 25 and the pinion 24 being in engagement with each other the rack bar is driven forward, pulling the wire-cutters and carriers 84, 84ª with it across and above the needles 92, 92ª, the wires which are gripped in the cutters and carriers being drawn across in front of the gripping fingers 76, 76ª on the stripping members. The cam 38 is just long enough to retain the double lever 42 and the upright sliding frame 45 in the position just described until the rack-bar has drawn the wire cutters and carriers 84, 84ª completely across the needles, the termination of the cam 38 and the corresponding slot 40 stopping the forward movement of the cutters and carriers by returning the double lever 42 and the upright sliding frame 45 supporting the rack bar, to their normal positions, thereby releasing the rack bar 25 and the pinion 24 from engagement with each other. The completion of the forward movement of the cutters and carriers 84, 84ª above the needles 92, 92ª brings the anti-friction rollers 85ᵇ on the cutting and gripping fingers 85, 85ª into engagement with the rear ends of the slots 87, 87ª in the rods 80, 80ª, thereby permitting the cutting and gripping fingers to drop and to release the wires which they have been holding; at the same time the bevel pinion 56, having passed out of engagement with the bevel pinion 55, at once comes into engagement with the bevel pinion 55ª, causing the double cranks 54, 54ª to be turned in the reverse direction, pushing the needles 92, 92ª back across the press and pulling the wire stripping members 72, 72ª back to their normal positions.

At the beginning of the return movement of the wire stripping members 72, 72ª, the wire-gripping fingers 76, 76ª immediately close down and firmly grip the wires just as they are released by the cutters and carriers 84, 84ª and, carrying the free ends of the wires with them, they pass under the natural loop $b'$ formed by the needles, and under the grooved rollers 93, 93ª of the needles, which latter immediately slip back through the loops $a'$ that are formed and held by the flanged rollers 62, 62ª, these loops $a'$ being then stripped from the flanged rollers by the pull of the wire-stripping members 72, 72ª, and with the free ends of the wires passing through the loops $b'$ formed by the needle and gripped by the stripping members, the loops $a'$ are pulled down securely around the loops $b'$ thus forming a secure knot (Fig. 20) which cannot become untied. The wires gripped in the stripping members 72, 72ª are released by the rollers 72ᵇ dropping into sloping depressions or slots 79ᵇ in the proper place on the rods 71, 71ª. Just before the bevel gear 27 completes its revolution the cam 39 is brought into contact with the roller 41 thereby again raising said lever and depressing the sliding frame 45 and the rack-bar 25 on to the pinion 24, the roller 41ª on the double lever fitting into the slot 40ª in the flange 37. The rack-bar resting on the pinion 24 is again moved forward pulling the cutters and carriers 84, 84ª with it and these immediately engage the upright lever 89ᶜ on the wire engaging fingers, 89, 89ª on the sliding frame 88, causing the said fingers to rise, and lift the wires with them to a position equal with the tops of the flanged rollers 62, 62ª. At this time the wires gripped in the stripping members 72, 72ᵃ have not been released and the wires leading from the end loop b' back across the press to the spools 100, 100ᵃ are in a position just above the fingers 89, 89ᵃ. The wires being raised by the fingers 89, 89ᵃ, the forward movement of the cutters and carriers 84, 84ᵃ push the sliding frame 88 before them, the finger 89 carrying the wires back moves also until the wires are in a position between the flanged rollers 62, 62ᵃ and the fixed frame 60. At this time the mutilated pinion 65 has nearly completed its revolution the same as the bevel pinion 56, and the bevel gear 27, and thus at the finish of its revolution the pinion 65 again engages the transmission pinion 63, thereby imparting the remaining one-fourth of a revolution to the sprockets 59, 59ᵃ and the flanged rollers 62, 62ᵃ, bringing these rollers to positions with their axes upright to support the next wires, which are prevented from dropping below the flanged rollers by the adjacent slots in the side of the press just back of the rollers, the bottoms of the slots at this point being just even with the flanges on the rollers when they are in upright positions. The forward movement of the sliding frame 88 having been completed, the roller 41 drops from the cam 39 and falls into the slot 40ᵇ, and the roller 41ᵃ is engaged by a narrow extension 38ᵃ of the cam 38, which reaches across the flange 37, thus causing the upright sliding frame 45 to be raised bringing the under side of the rack-bar 25 into engagement with the under side of the pinion 24 and being retained in this position by the notched end 48ᵃ of the latch lever 48 resting on the bracket 34 until released by the tripping action of the fixed arm 25ᵃ on the forward end of the rack bar. The cam 38, passing by the roller 41ᵃ leaves it suspended in this position, ready to spring back and rest against the flange 37 when the rack bar 25 is released from the pinion 24. At the same time, just as the cam 38 has passed the roller 41, the clutch lever 28 comes in contact with the trip lever 32, and thus completes the revolution of the bevel gear 27. The lower member of the rack-bar 25 being in contact with the under side of the pinion 24, the said rack bar will be driven toward the rear of the press and so moved in this direction to force the cutters and carriers 84, 84ᵃ before it, and they immediately engage, cut and grip the new wires and reel them from the spools on the opposite side of the press around the pulleys 105, 105ᵃ, the wires passing across the compression chamber and around the flanged rollers 62, 62ᵃ and along the side of the press to the cutters and carriers 84, 84ᵃ, which are driven to their extreme rearward position by the rack bar which is then released by the fixed arm 25ᵃ coming in contact with the supporting lever 48, the rack bar then dropping down into its normal position free of the pinion 24 and ready to be moved forward again by the next bale of hay. At the completion of the rearward movement of the rack-bar the sliding frame 88 is returned to its normal position by the projection 90 on said rack-bar coming in contact with the stud or lug 91 on the said frame 88 and at the same time another charge of hay is forced into the compression chamber 19 and the formation of another bale begins.

The described construction affords a practical means of carrying my invention into effect, and I would state in conclusion that I do not limit myself to the mechanical form of the machine as illustrated, since manifestly the same can be considerably varied without departure from the spirit of the invention as defined in the appended claims. Similarly it is to be understood that the term "wire" includes any equivalent flexible strand, such as cord or the like.

Having thus described my invention, I claim as new and desire to secure by Letters Patent:

1. In an apparatus of the character described, a baling press including bale-forming means; wire-supplying means at one side of the press; wire-carrying means movable transversely of the press to dispose a double strand of wire in looped form from said supplying means in front of the bale in position to subject the wire to the advancing movement of the bale, and to again carry the wire across the rear of a formed bale, and a loop forming mechanism arranged at the opposite side of the press from the wire-supplying means and movable to position its loop to receive the loop of the said wire-carrying means; together with means to complete a knot in the wire as thus looped.

2. In an apparatus of the character described, a baling press including bale-forming means, wire-supplying means at one side of the press, wire-carrying means movable to dispose a double strand of wire in looped form transversely across the press subject to the advancing movement of the bale, to cause the wire to embrace the bale at the front and sides, and to again carry the wire transversely behind the bale, and mechanism at the opposite side of the press from the supplying means co-acting with the said wire-carrying means and movable to position its loop to receive the loop of the said wire-carrying means; together with means to complete a knot in the wire as thus looped.

3. In an apparatus of the character described, a baling press including bale-forming means, wire-supplying means at one side of the press; wire-carrying means movable transversely of the press to dispose a double strand of wire in looped form from said supplying means in front of the bale in position to subject the wire to the advancing movement of the bale, and to again carry the wire across the rear of a formed bale, and means arranged at the opposite side of the press from the wire-supplying means and co-acting with said wire-carrying means to connect the meeting portions of the wire, said last-mentioned means including mechanism to form a loop and position the same for receiving the loop of the wire-carrying means; together with means to sever the wire.

4. In an apparatus of the character described, a baling press including bale-forming means, wire-supplying means at one side of the press, wire-carrying means movable to dispose a double strand of wire in looped form transversely across the press subject to the advancing movement of a bale, to cause the wire to embrace the bale at the front and sides, and to again carry the wire transversely behind the bale, and mechanism at the opposite side of the press from the supplying means co-acting with the said wire-carrying means to connect the meeting portions of the wire and sever the same, said last-mentioned means including mechanism to form a loop and to position the same for receiving a loop of the wire-carrying means.

5. In a baling press, bale-forming means including a bale chamber; means to position a wire across the bale chamber in succession at the front and in the rear of a bale, and means on opposite sides of the chamber to hold said wire in position in front of the bale, each of said means at the opposite sides acting to feed the wire as the bale advances.

6. In a baling press, bale-forming means including a bale chamber; means to position a wire across the bale chamber in succession at the front and in the rear of a bale, and means on opposite sides of the chamber each acting to feed the wire as the bale advances; together with mechanism to knot the wire on the formed bale.

7. In a baling press, bale-forming means including a bale chamber; means to position a wire across the bale chamber in succession at the front and in the rear of a bale, means on opposite sides of the chamber each acting to feed the wire as the bale advances, and means to knot the wire and sever the wired bale.

8. A baling press comprising bale-forming means including a bale chamber; means to position a wire across the bale chamber in front of a bale and again in the rear of a formed bale, and means at opposite sides of the press to feed the wire, said last-mentioned means at one side including a spool and at the opposite side including a longitudinally reciprocating wire carrier movable by the pull of the wire as the bale advances.

9. A baling press comprising bale-forming means including a bale chamber; means to position a wire across the bale chamber in front of a bale and again in the rear of the formed bale, and means at opposite sides of the press to feed the wire as the bale advances; together with means to tie the wire upon completion of the bale, said feed means at one side consisting of a spool subject to the tension on the wire as the bale advances and responsive to said tension to feed the wire to the advancing bale, the feed means at the opposite side of the press including a wire holder mounted to travel longitudinally of the press as the bale advances and subject to the tension of the wire to cause the holder to travel.

10. A baling press comprising bale forming means including a bale chamber; means to position a wire across the bale chamber in front of a bale and again in the rear of a formed bale, and means to feed the wire as the bale advances; together with means to sever and knot the wire after the rear stretch is in position behind a formed bale, said feed means including a wire spool at one side responsive to tension on the wire to feed the same as the bale advances and a wire holder mounted to travel longitudinally at the opposite side of the press and responsive to the tension on the wire caused by the advancing bale and movable in one direction by a pull on the wire to feed the same to the bale; together with means to return the said wire holder after the bale is formed.

11. A baling press comprising bale-forming means including a bale chamber; a needle movable transversely to position a wire across the press, feed means to hold the wire at both sides of the chamber and feed the same, subject to pressure of an advancing bale in process of formation and to extend the wire in a double strand across the rear of a formed bale, and means to knot the wire on the said bale, said last-mentioned means including loop forming mechanism on the press at the side toward which the needle carries the wire, to form a loop on the wire in front of the needle and in position for the needle to carry therethrough the loop of its double strand.

12. A baling press comprising bale-forming means; wiring means including a carrier movable transversely across the baling press and acting to carry a continuous double strand of wire in looped form, and a second loop-forming mechanism movable to position its loop to receive the loop of the carrier; together with means to carry a wire end through the first mentioned loop between the bend thereof and the second loop.

13. A baling press comprising bale-forming means; wiring means including a carrier movable transversely across the baling press and acting to carry a continuous double strand of wire in looped form, and a second loop-forming mechanism movable to position its loop to receive the loop of the carrier, together with means to carry a wire end through the first mentioned loop between the bend thereof and the second loop, and means to sever the wired bale from the remainder of the wire.

14. A baling press comprising bale-forming means including a bale chamber; wire supplying means at one side of the press; bale-wiring means including a transversely movable carrier acting to carry the wire in the form of a looped double strand across the bale chamber between adjacent bales; means at the opposite side of the chamber from the supply to form a second loop in the wire, said last mentioned means including a wire-gripper movable longitudinally of the press across the path of movement of the said carrier to position the second loop for receiving the loop on the carrier, and a transversely movable wire stripper in front of the carrier timed to strip the wire from the second loop-forming means and draw it through the loop on the carrier in front of the second loop.

15. A baling press comprising bale-forming means including a bale chamber; a wire-supplying means at one side of the press; bale-wiring means including a transversely movable carrier acting to carry the wire in the form of a looped double strand across the bale chamber between adjacent bales; means at the opposite side of the chamber from the supply to form a second loop in the wire, said last mentioned means including a wire-gripper movable longitudinally of the press across the path of movement of the said carrier to position the second loop for receiving the loop of the carrier, a transversely movable wire stripper in front of the carrier timed to strip the wire from the second loop-forming means and draw it through the loop on the carrier in front of the second loop, and means to sever the wired bale from the wire on the supplying means.

16. A baling press comprising bale-forming means including a bale chamber, a wiring and knotting mechanism, comprising a wire supplying means on one side of the chamber and a longitudinally reciprocating wire gripper at the opposite side of the chamber, a transversely movable carrier adapted to carry the wire in the form of a looped double strand from the wire-supplying means to the said gripper, means co-acting with the gripper to form a loop in the path of the carrier for receiving the looped strand of the latter, and a transversely movable stripper in front of the carrier and timed to take the wire from the gripper through the looped strand of the carrier.

17. A baling press comprising bale-forming means including a bale chamber, a wiring and knotting mechanism, comprising a wire supplying means on one side of the chamber and a longitudinally reciprocating wire gripper at the opposite side of the chamber, a transversely movable carrier adapted to carry the wire in the form of a looped double strand from the wire-supplying means to the said gripper, means co-acting with the gripper to form a loop in the path of the carrier for receiving the looped strand of the latter, and a transversely movable stripper in front of the carrier and timed to take the wire from the gripper through the looped strand of the carrier; together with means to engage the wire on the carrier and position the same relatively to the said co-acting means in position to be again gripped by the said gripper.

18. A baling press comprising bale-forming means, including a bale chamber, a wiring and knotting mechanism comprising a wire-supplying means on one side of the chamber and a longitudinally reciprocating wire gripper at the opposite side of the chamber, a transversely movable carrier adapted to carry the wire in the form of a looped double strand from the wire-supplying means to the said gripper, means co-acting with the gripper to form a loop in the path of the carrier receiving the looped strand of the latter, and a transversely movable stripper in front of the carrier and timed to take the wire from the gripper through the looped strand of the carrier; together with means to engage the wire on the carrier and position the same relatively to the said co-acting means in position to be again gripped by the said gripper, the said gripper having wire severing means to sever the wire as it is gripped.

19. A baling press comprising bale-forming means including a bale chamber; wire supplying means on one side of the press; a transverse wire-carrier adapted to carry the wire, in the form of a looped double strand, from the supplying means to the opposite side, thereby to supply a strand for the back of one bale and position the second strand to receive pressure of the material of a succeeding bale, a longitudinally movable wire carrier at said opposite side having a wire cutter and a device to grip the second transverse strand and be subject to pressure of the material thereon as the bale advances in the bale chamber, said carriers having intersecting paths and being timed to meet when a bale is completed, a guide sheave adjacent to the intersection of the said paths around which the wire will run from the longitudinal carrier as the bale proceeds, and means to turn the guide roller bodily about an axis at an angle to the path of the transverse carrier and thereby loop the wire gripped by the longitudinal carrier and a reciprocating stripper movable to and from the intersection of the said paths, and provided with means to grip the wire on the longitudinal carrier to carry the same through the loop of the transverse carrier; means adjacent to said guide roller to place thereon the loop from the transverse carrier in position to be cut and gripped by the longitudinal carrier after disengagement of its own loop, and actuating means for the transverse carrier, stripper, guide roller and loop-placing means, said actuating means being controlled by the movement of the longitudinal carrier.

20. A baling press comprising bale-forming means including a bale chamber; wire supplying means on one side of the press, a transverse wire-carrier adapted to carry the wire, in the form of a looped double strand, from the supplying means to the opposite side, thereby to supply a strand for the back of one bale and position the second strand to receive pressure of the material of a succeeding bale, a longitudinally movable wire carrier at said opposite side having a wire cutter and a device to grip the second transverse strand and be subject to pressure of the material thereon as the bale advances in the bale chamber, said carriers having intersecting paths and being timed to meet when a bale is completed, and means adjacent to the intersection of said paths to fasten the loops of the carriers and cause the longitudinal carrier to engage the second strand of the transverse carrier.

21. A baling-press comprising bale-forming means including a bale chamber; wire-supplying means on one side of the press, a transverse wire carrier adapted to carry the wire, in the form of a looped double strand, from the supplying means to the opposite side, thereby to supply a strand for the back of one bale and position the second strand to receive pressure of the material of a succeeding bale, a longitudinally movable wire carrier at said opposite side having a wire cutter and a device to grip the second transverse strand and be subject to pressure of the material thereon as the bale advances in the bale chamber, said carriers having intersecting paths and being timed to meet when a bale is completed, and means adjacent to the intersection of said paths to fasten the loops of the carriers and cause the longitudinal carrier to engage the second strand of the transverse carrier there being means to sever the wire as the loops are fastened.

22. A baling press comprising bale-forming means including a bale chamber; wire supplying means on the side of the press, a transverse wire carrier adapted to carry the wire, in the form of a looped double strand, from the supplying means to the opposite side, thereby to supply a strand for the back of one bale and position the second strand to receive pressure of the material of a succeeding bale, a longitudinally movable wire carrier at said opposite side having a wire cutter and a device to grip the second transverse strand and advance as the strand is subjected to pressure of the material thereon as the bale advances in the bale chamber, said carriers having intersecting paths and being timed to meet when a bale is completed, a rack bar reciprocating with the longitudinal carrier; means to actuate the rack bar to move the said carrier after a movement thereof by the material of the bale, and to give a return movement to said rack bar and longitudinal carrier, the said actuating means being controlled by the initial movement of the said longitudinal carrier and rack bar, and coöperating means adjacent to the intersection of the said paths and driven and timed by the said actuating means to fasten the loops of the carriers and cause the longitudinal carrier to grip the second strand of the transverse carrier.

23. A baling press comprising bale-forming means including a bale chamber; wire supplying means on one side of the press, a transverse wire carrier adapted to carry the wire, in the form of a looped double strand, from the supplying means to the opposite side, thereby to supply a strand for the back of one bale and position the second strand to receive pressure of the material of a succeeding bale, a longitudinally movable wire carrier at said opposite side having a wire cutter and a device to grip the second transverse strand and be subject to pressure of the material thereon as the bale advances in the bale chamber, said carriers having intersecting paths and being timed to meet when a bale is completed, a rack bar reciprocating with the longitudinal carrier; means to actuate the rack bar to move the said carrier after a movement thereof by the material of the bale, and to give a return movement to said rack bar and longitudinal carrier, the said actuating means being controlled by the initial movement of the said longitudinal carrier and rack bar, coöperating means adjacent to the intersection of the said paths and driven and timed by the said actuating means to fasten the loops of the carriers and cause the longitudinal carrier to grip the second strand of the transverse carrier, and means to sever the wire as the loops are fastened.

24. A baling press including means for positioning transversely of the press a strand of wire for the rear of a formed bale, and a second strand for the front of the next following bale, and means to hold and feed the second strand and extend the same at the sides of the bale being formed as the formation of the bale progresses, said feed means including a spool at one side of the press and a wire carrier at the opposite side of the press and having a sliding advance movement thereon in response to a pull on the wire caused by the advancing bale; together with means to return the carrier after reaching the limit of its advance movement.

25. A baling press including means for positioning transversely of the press a strand of wire for the rear of a formed bale, and a second strand for the front of the next following bale; feed means at the opposite sides of the press to hold the second strand, each of said feed means acting to feed the wire at the sides of the bale being formed as the formation of the bale progresses, together with means to secure the meeting portions of the wire upon completion of a bale and the positioning of the rear strand therefor.

26. A baling press including means to position a wire transversely of the press and means to sustain the wire subject to the pressure of the bale being formed, means at the opposite sides of the press each adapted to feed the wire, to supply extensions of the wire at the sides of the bale as the formation of the bale proceeds, said first means having a recurring movement to extend the wire at the rear of the formed bale.

27. A baling press including means to position a wire transversely of the press and feed means at opposite sides of the press each adapted to hold the wire and subject to the pressure of the bale being formed, to feed the wire at both sides of the press and supply extensions of the wire at the sides of the bale as the formation of the bale proceeds, said first means having a recurring movement to extend the wire at the rear of the formed bale, together with means to unite the meeting portions of the wire on the formed bale.

28. A baling press including means on one side of the press to supply a tying wire; means to position a wire from the supply transversely of the press in the form of a looped double strand, means to sever said strand at the opposite side of the press adjacent to the loop thereof, and to grip one of the severed strands; means to cause the gripping means to travel and carry the gripped strand longitudinally of the press, subject to reverse movement under pressure against the transverse portion of the gripped wire by the material being baled, the said supply means being also responsive to the pressure of the advancing material against the gripped wire to continue the wire along the adjacent side of the bale as the reverse movement of the gripped wire supplies the wire for the second side of the bale; means to cause a recurring movement of the second mentioned means to again position the looped double strand to be severed and a strand thereof gripped upon completion of a bale, and means to unite the other of the last mentioned strands to the adjacent end of the wire on the completed bale.

29. A baling press including means on one side of the press to supply a wire, a needle adapted to carry a wire in the form of a looped double strand from said supply to the opposite side of the press, a carrier movable longitudinally on the other side of the press in a path transsecting the path of the needle, the carrier being provided with a wire gripper and means to sever the wire at said opposite side; a guide adjacent to the intersections of said paths, over which the wire may run from the carrier, said guide constituting a twister; actuating means for said guide to give the twisting movement; means to place the wire on the guide; a drive means; means to connect the carrier and drive for moving the carrier from one side of the path of the needle across said path toward one end of the press after a wire is gripped, the transverse portion of the gripped and carried wire being subject to pressure of the material being baled, and the carrier and supply being responsive to the said pressure to dispose the wire at the sides of the bale and return the carrier adjacent to the path of the needle and with the wire therefrom in looped form at the twister; a stripper movable transversely to and from the intersection of the said paths; means to simultaneously and oppositely actuate the stripper and needle to and from each other; means controlled by the said return movement of the carrier to connect the drive with the said actuating means of the twister, needle and stripper as the carrier approaches the needle path and establish driving connection between the drive and the carrier to continue the return movement of the carrier across the path of the needle to its original position, the forward movement of the needle serving to carry its loop through the loop at the twister, means to actuate the gripper on the carrier for release of the wire and for the gripping of a strand of the severed wire, and the stripper having means to engage the wire end first held by the carrier and draw said end through the loop of the needle as the stripper is given the receding movement.

30. A baling press comprising means on one side of the press to supply a wire; a needle adapted to carry a wire in the form of a looped double strand from the said supply to the opposite side of the press; a carrier movable longitudinally of the press on said opposite side thereof in a path transsecting the path of the needle, a cutter and gripper on the carrier; a rack presenting two rack members and mounted to travel in unison with the carrier; a twister adjacent to the intersection of said paths, presenting a roller turning on its own axis and revoluble bodily about a second axis; a wire placing lever positioned adjacent to the twister to place a wire thereon from the needle, the wire placer being operated by the movement of the carrier in one direction and by movement of the rack in the opposite direction; a drive means including two continuously rotating drive elements, one of which is arranged to be engaged by a rack member; a rotary driven element; a clutch adapted to rotate with said driven element; means controlled by the movement of the rack to engage the said driven element with the second revolving drive element; a stripper movable transversely to and from the point of intersection of the needle; means operated by said driven element to actuate the stripper and needle simultaneously and oppositely and actuate the twister; means controlled by the movement of the clutch to engage the rack with the adjacent revolving drive element for giving movement to the rack and carriage in one direction across the path of the needle, and then to disengage the rack from its drive element when the rack has completed said movement, said clutch controlled means serving to again establish engagement of the other member of the rack with the adjacent drive element to give reverse movement to the rack and carrier, a stripper having means to engage a wire on the carrier and draw the same through the loop carried by the needle upon a receding movement of the stripper, and means controlled by the reverse movement of the rack to disengage the driven element from its drive element and disengage said rack from its drive element upon the rack completing its reverse movement.

In testimony whereof I have signed my name to this specification in the presence of two subscribing witnesses.

WEBB R. SMITH.

Witnesses:
J. A. HARRELL,
J. S. McSPARRAN.